(12) United States Patent
Przymusinski et al.

(10) Patent No.: US 6,311,669 B1
(45) Date of Patent: Nov. 6, 2001

(54) METHOD FOR DETERMINING THE INJECTION TIME IN A DIRECT-INJECTION INTERNAL COMBUSTION ENGINE

(75) Inventors: Achim Przymusinski, Regensburg; Thomas Rader, Reutlingen; Ralf Schernewski, Karlsruhe, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/663,587

(22) Filed: Sep. 18, 2000

Related U.S. Application Data

(63) Continuation of application No. PCT/DE99/00652, filed on Mar. 10, 1999.

(30) Foreign Application Priority Data

Mar. 16, 1998 (DE) ............................................. 198 11 359

(51) Int. Cl.[7] ...................................................... F02B 3/00
(52) U.S. Cl. ................................................................ 123/300
(58) Field of Search ...................................... 123/299, 300

(56) References Cited

U.S. PATENT DOCUMENTS

| 4,841,936 | 6/1989 | Takahashi . | |
|---|---|---|---|
| 5,054,445 | * 10/1991 | Henkel et al. | 123/300 |
| 5,176,122 | 1/1993 | Ito . | |
| 5,678,521 | 10/1997 | Thompson et al. . | |
| 5,975,056 | * 11/1999 | Augustin et al. | 123/300 |
| 6,073,606 | * 6/2000 | Shimizu et al. | 123/299 |
| 6,073,608 | * 6/2000 | Krieger et al. | 123/300 |
| 6,082,331 | * 7/2000 | Barnes et al. | 123/300 |
| 6,164,264 | * 12/2000 | Thomas | 123/300 |

OTHER PUBLICATIONS

Patent Abstracts of Japan No. 62–186034 (Daisaku), dated Aug. 14, 1987.

\* cited by examiner

*Primary Examiner*—John Kwon
(74) *Attorney, Agent, or Firm*—Herbert L. Lerner; Laurence A. Greenberg; Werner H. Stemer

(57) ABSTRACT

Pressure fluctuations occurring during two sequential injections (for example a pre-injection and a main injection) within a working cycle of a cylinder in a lead to the injector are taken into account with the aid of a correction term. A drive time of the injectors is determined with the aid of a corrected pressure so that a desired fuel quantity is injected. The correction term is determined with the aid of a least-squares estimator that estimates the injection pressure at the nozzle of injector as a function of the geometrical data of the system, in particular a length of the lead from the rail to the injector and physical boundary conditions, for example a fuel temperature.

8 Claims, 4 Drawing Sheets

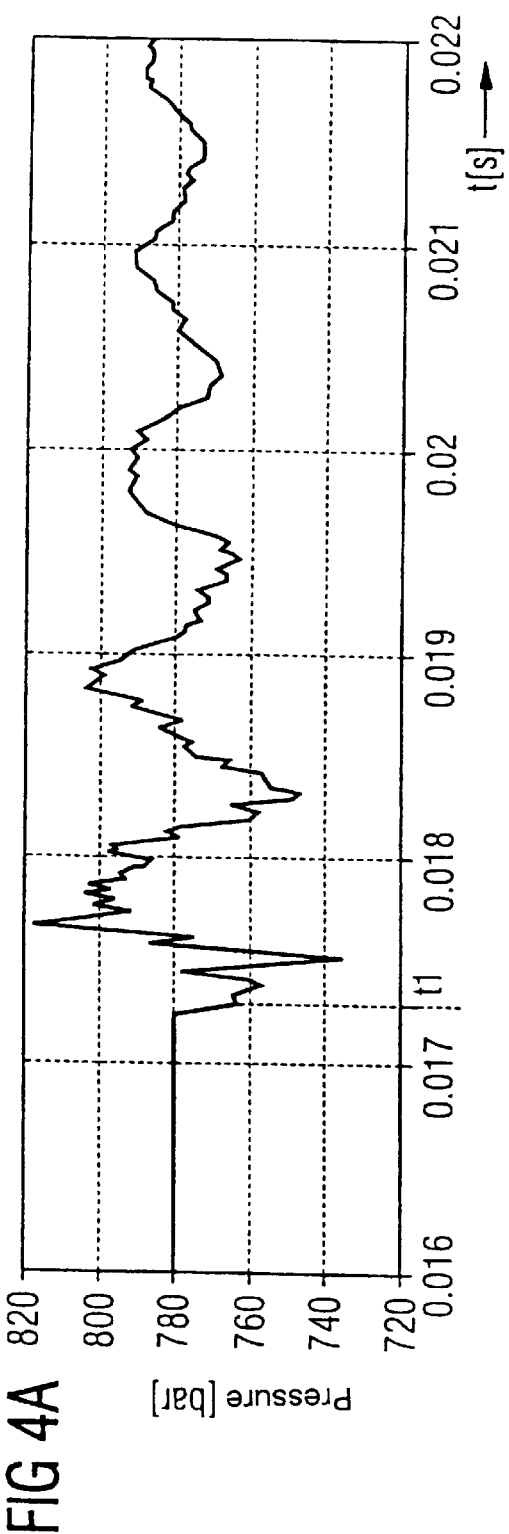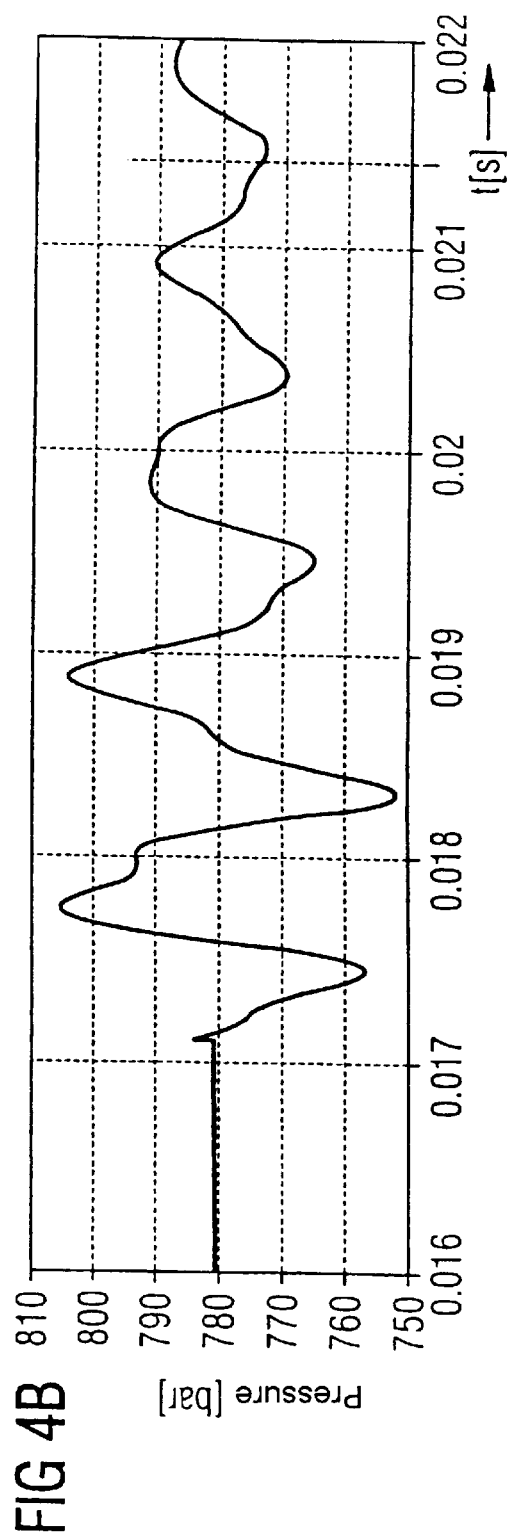

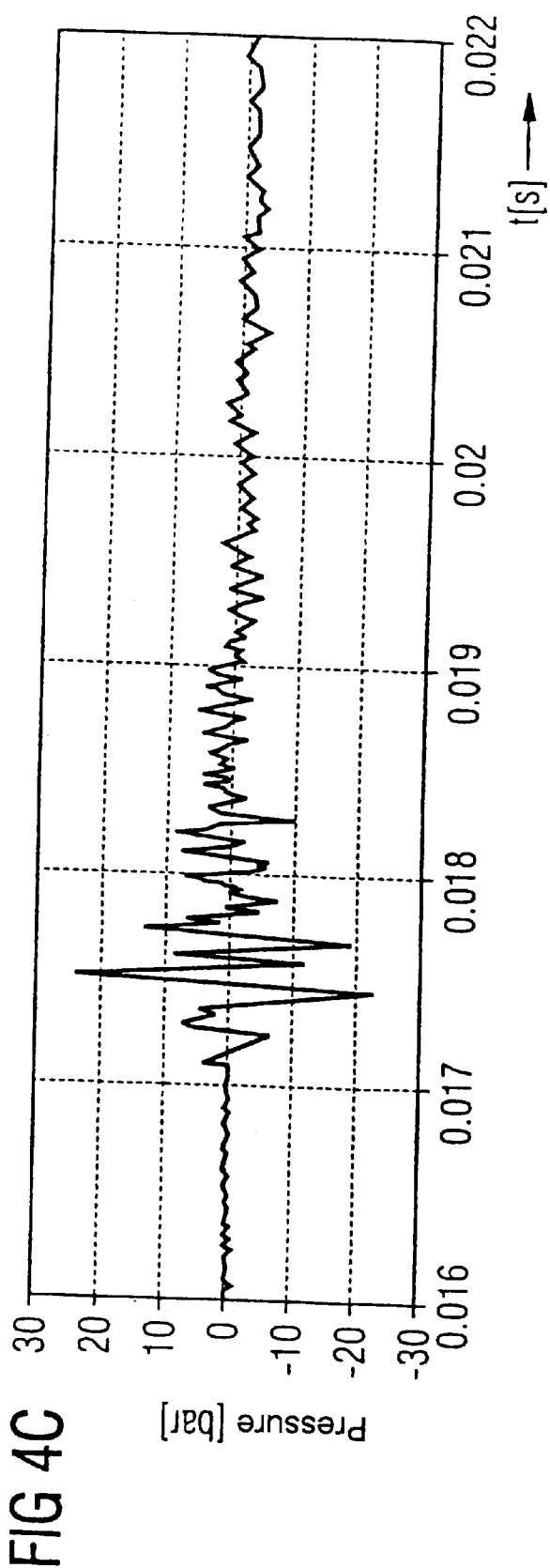

METHOD FOR DETERMINING THE INJECTION TIME IN A DIRECT-INJECTION INTERNAL COMBUSTION ENGINE

CROSS-REFERENCE TO RELATED APPLICATION

This is a continuation of copending International Application No. PCT/DE99/00652, filed Mar. 10, 1999, which designated the United States.

BACKGROUND OF THE INVENTION

FIELD OF THE INVENTION

The invention relates to a method for determining the injection time in a direct-injection internal combustion engine.

The diesel direct injection is controlled by a controller. it is known to split up the injection process into one or more pre-injections and into one or more main injections in order to optimize combustion characteristics with regard to exhaust gas emission and combustion noise. A drive time of the injectors that is required for a desired quantity to be injected into the cylinders is determined by a characteristic diagram. An important input variable for the characteristic diagram is an instantaneous pressure in a lead or in the pressure reservoir, frequently denoted as a common rail or simply as a rail, since this is detected by measurement. The pressure in the lead is assumed to be constant in known systems. That is to say, the drive time of the injectors is determined with the aid of the same pressure for the pre-injection and also for the main injection. However, the pressure between two sequential injections, for example between the pre-injection and the main injection, can be regarded as constant only as a coarse approximation, as measurements substantiate. Pressure fluctuations are produced in the injector and in the lead and give rise to a marked change in the injection quantity.

SUMMARY OF THE INVENTION

It is accordingly an object of the invention to provide a is method for determining the injection time in a direct-injection internal combustion engine which overcomes the above-mentioned disadvantages of the prior art methods of this general type, in which the fuel quantity to be fed corresponds as exactly as possible to a desired value when the injection process is split up into a plurality of injections.

With the foregoing and other objects in view there is provided, in accordance with the invention, a method for determining an injection time in a direct-injection internal combustion engine having a high-pressure reservoir containing fuel and connected to an injector so that the fuel can be injected under control into a cylinder of the internal combustion engine as a function of at least a pressure in the high-pressure reservoir and a required fuel quantity. The method includes splitting up a total quantity of the fuel to be fed to the cylinder of the internal combustion engine into at least two injection processes per cylinder stroke; and taking into account pressure fluctuations in the injector occurring between the two injection processes, and in a line between the high-pressure reservoir and the injector when determining the injection time for a next injection process.

The pressure fluctuations occurring during two sequential injections (for example the pre-injection and the main injection) within the same working cycle of a cylinder in the lead to the injector are taken into account with the aid of a correction term. The drive time of the injectors is determined with the aid of the corrected pressure so that the desired fuel quantity is injected. The correction term is determined with the aid of a least-squares estimator that estimates the injection pressure at the nozzle of the injector as a function of the geometrical data of the system, in particular a length of the lead from the rail to the injector and the physical boundary conditions, for example the fuel temperature.

In accordance with an added feature of the invention, there is the step of feeding in the total quantity of the fuel in a pre-injection process and a main injection process, and taking into account the pressure fluctuations initiated by the pre-injection process when determining the injection time for the main injection process.

In accordance with an additional feature of the invention, there is the step of feeding in the total quantity of the fuel in a plurality of pre-injection processes and one main injection process, and taking into account the pressure fluctuations initiated by each of the pre-injection processes when determining the injection time for one of a respectively following pre-injection and the main injection process.

In accordance with another feature of the invention, there is the step of using the pressure fluctuations occurring between individual injection processes in each case to determine a correction term with an aid of which the pressure in the high-pressure reservoir is corrected, and determining the injection time with an aid of a corrected pressure value.

In accordance with another added feature of the invention, the corrected pressure value is an input variable of a characteristic map in which injection times are stored in dependence on the required fuel quantity.

In accordance with another addition feature of the invention, there is the step of determining the correction term with an aid of a least-squares estimator which, on a basis of an equation of a damped oscillation for the pressure fluctuations determines the injection pressure at a nozzle of the injector in dependence on geometrical data of an injection system and of physical boundary conditions.

In accordance with further added feature of the invention, there is the step of defining the equation of the damped oscillation for the pressure fluctuations as:

$$y(t) = A \cdot e^{-d \cdot (t-t_0)} \cdot \sin(2 \cdot \pi \cdot f(t-t_0) + \phi) \cdot \sigma(t-t_0)$$

| where | | |
|---|---|---|
| | A | is an amplitude of an oscillation, |
| | d | is a damping factor, |
| | $t_0$ | is a starting instant of the oscillation, |
| | f | is a frequency, |
| | $\phi$ | is a phase, and |
| | $\sigma(t - t_0)$ | is a jump function at an instant t = 0. |

In accordance with a concomitant feature of the invention, there is the step of using a further equation for determining an estimated pressure characteristic defined by:

$$p(t) = \frac{\hat{b}_2}{\cos\left(\arctan\frac{\hat{b}_1}{\hat{b}_2}\right)} \cdot e^{-d \cdot (t-t_0)} \cdot \sin\left(\omega(t-t_0) + \arctan\frac{\hat{b}_1}{\hat{b}_2}\right) \cdot \sigma(t-t_0),$$

where

-continued $$b_1 = A \cdot \sin\varphi$$
$$b_2 = A \cdot \cos\varphi.$$

Other features which are considered as characteristic for the invention are set forth in the appended claims.

Although the invention is illustrated and described herein as embodied in a method for determining the injection time in a direct-injection internal combustion engine, it is nevertheless not intended to be limited to the details shown, since various modifications and structural changes may be made is therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 4a–4c are graphs of a comparison between the measured pressure characteristic, an estimated pressure characteristic and an error, calculated therefrom, of the estimator.

DESCRIPTION OF THE PREFERRED EMBODIMENTS

Figure 1:
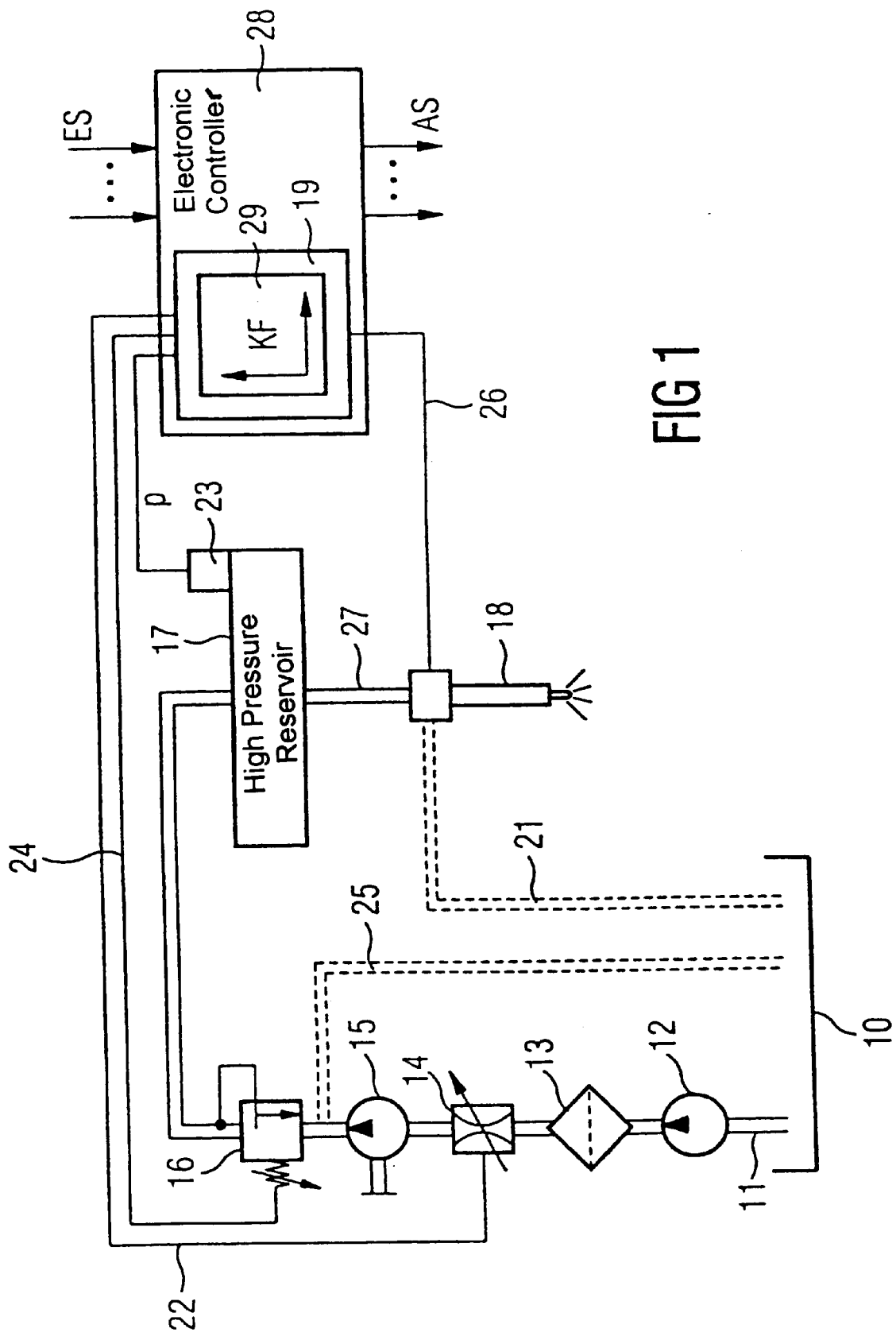
FIG. 1 is a block diagram of an injection system for a direct-injection internal combustion engine according to the invention.

In all the figures of the drawing, sub-features and integral parts that correspond to one another bear the same reference symbol in each case. Referring now to the figures of the drawing in detail and first, particularly, to FIG. 1 thereof, there is shown a schematic configuration of a fuel injection system for a direct-injection internal combustion engine as it is used under the designation of a common-rail system, chiefly in motor vehicles having a diesel internal combustion engine.

In the injection system, fuel is taken in by a predelivery pump 12 from a fuel tank 10 via a fuel line 11. The predelivery pump 12 delivers the fuel via a fuel filter 13 to a high-pressure pump 15 which compresses the fuel and feeds it into a high-pressure reservoir 17 under high pressure.

In order to be able to set a volumetric flow of the high-pressure pump 15 into the high-pressure reservoir 17 in accordance with the respective operating conditions of the internal combustion engine as required, there is disposed in the fuel line 11 between the predelivery pump 12 and the high-pressure pump 15 an additional suction throttle valve 14 with the aid of which the delivery rate of the high-pressure pump can be controlled. The suction throttle valve 14 is driven is by a control unit 19 via a control line 22. The control unit 19 is preferably integrated into an electronic controller 28 of the internal combustion engine that controls and/or regulates all the cycles required for operating the internal combustion engine. For this purpose, the controller 28 of the internal combustion engine is fed a multiplicity of input signals ES picked up by corresponding sensors. The individual actuators and components that are required for operating the internal combustion engine are driven via output signals AS.

In order t o be able to set the pressure in the high-pressure reservoir 17 in accordance with the desired operating conditions of the internal combustion engine, a pressure control valve 16 is, furthermore, connected into the fuel line 11 downstream of the high-pressure pump 15. Via a fuel line 25, the pressure control valve 16 controls and/or regulates excess fuel which is not required to maintain a desired pressure in the high-pressure reservoir 17 by sending it into the fuel tank 10. A holding pressure of the pressure control valve 16 is set by the control unit 19 via a control line 24. A pressure sensor 23 is further provided for the purpose of controlling the pressure in the high-pressure reservoir 17. The pressure sensor 23 serves the purpose of detecting a pressure p instantaneously prevailing in the high-pressure reservoir 17 and on the basis of which the control unit 19 undertakes to control the pressure via the pressure control valve 16 in accordance with the desired operating conditions of the internal combustion engine.

Fuel pressures of 0 to 1500 bars can be produced in the high-pressure reservoir 17 with the aid of the pressure control devices illustrated. These fuel pressures are present via fuel injection lines 27 at injectors or injection valves 18 (only one being shown), which are disposed in combustion chambers of the internal combustion engine. The injection valves 18 generally have an injection nozzle that is closed with the aid of a needle under spring force. The injection process is initiated by the control unit 19, which is connected to the injection valves 18 via control lines 26. A leakage flow occurring furthermore in the injection valves 18 is fed back into the fuel tank 10 via fuel lines 21.

Figure 2:
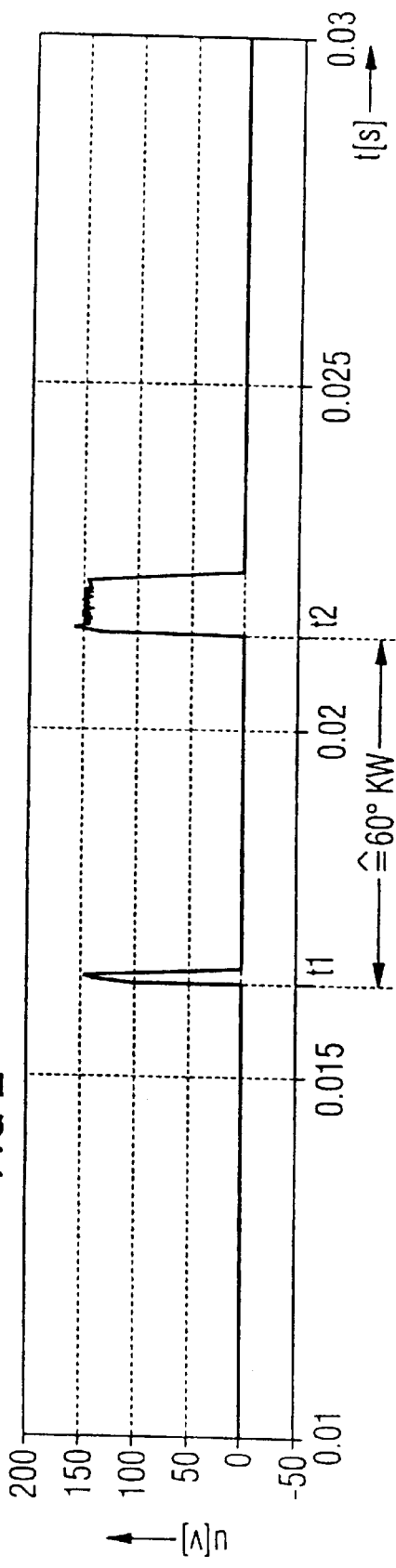
FIG. 2 is a graph of a drive voltage for an injector.

A temporal variation in a drive signal U for the injector 18 is illustrated in FIG. 2. At an instant t1, the injector 18 is driven to initiate a pre-injection. A main injection is performed at the instant t2 after a time interval that corresponds to a prescribed speed, in this example 60° crank angle KW.

Figure 3:
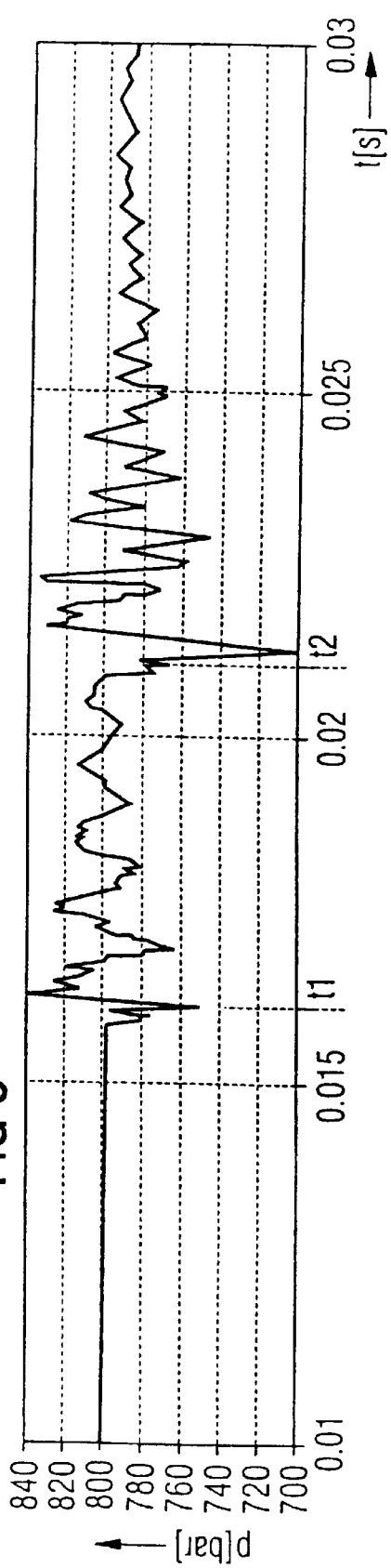
FIG. 3 is a graph of a pressure characteristic in a lead in the case of a pre-injection and a main injection.

A temporal pressure characteristic resulting from driving the injector 18 is shown in FIG. 3. Opening the nozzle of the injector 18 initiates a pressure fluctuation that has still not decayed at the instant of the start of the main injection. As may be seen from this illustration, a starting pressure at a start of the main injection differs from the pressure at a start of the pre-injection. Depending on the interval between the two injections, the starting pressure for the main injection can be higher or lower and, in addition, changes its value continuously in the form of a damped oscillation.

A short-time fast fourier transformation (FFT) known from signal processing is used to determine the typical frequencies and the amplitude of the oscillations which are initiated by the injection process.

The short-time FFT serves the purpose of analyzing the variation in frequency over time in the case of non-constat signals. For this purpose, a measured data record is subdivided into sections in which the signal can be regarded as stationary (constant), and these are then transformed individually into the frequency range by an FFT.

The start of the oscillation cannot be determined by a short-time FFT, since the frequency resolution is too low. One possibility is to use a cross-correlation function. In this case, an oscillation of the desired frequency that is limited in time to one period is correlated with the measured data record. The relative extreme produced thereby then corresponds to the temporal start of the oscillation.

The pressure fluctuations initiated by the injection process can be described using the signal formulation for a damped oscillation. It holds in general that:

$$y(t) = A \cdot e^{-d \cdot (t-t_0)} \sin(2 \cdot \pi \cdot f \cdot (t-t_0) + \phi) \cdot \sigma(t-t_0)$$

| where | A | is an amplitude, |
|---|---|---|
| | d | is a damping factor, |
| | $t_0$ | is a starting instant of the oscillation, |
| | f | is the frequency, |
| | $\phi$ | is a phase, and |
| | $\sigma(t - t_0)$ | is a jump function at the instant $t_0 = 0$. |

The five parameters of amplitude, damping factor, starting instant of the oscillation, frequency and phase are required in order to describe the signal formulation completely.

The frequency f is obtained from the frequency analysis by means of the FFT, and the starting instant of the oscillation is obtained with the aid of the cross-correlation function. The amplitude A, the damping d and the phase $\phi$ are determined for the signal model, specifically with the aid of the least-squares estimator described in more detail later.

The fuel mass in the lead of the injector is assumed to be stationary (constant) before the start of the pre-injection. A pressure wave is propagated, starting from a blind hole, by the opening of the nozzle needle of the injector 18. The expansion wave moves though the injector 18, into the lead 27 and finally into the rail 17. The fuel mass is set moving because of the pressure drop at the blind hole. Fuel particles that are situated near the blind hole are set moving and the fuel expands. That is to say the expansion wave initiates a compressional wave having the opposite direction of propagation. The pressure in the blind hole is thereby increased again. The movement produces a damped oscillation of the pressure in the blind hole. Starting from the equation specified above in general, this oscillation can be specified as:

$$p(t)_{Open} = A_{Open} \cdot e^{-d_{Open} \cdot (t - t_{Start} - t_{Delay1})} \cdot \sin(\omega_{Open}(t - t_{Start} - t_{Delay1}) + \phi_{Open}) \cdot \sigma(t - t_{Start} - t_{Delay1})$$

where

| $A_{Open}$ | is an amplitude of an opening wave, |
|---|---|
| $d_{Open}$ | is a damping of the opening wave, |
| $\phi_{Open}$ | is a phase of the opening wave, |
| $\omega_{Open}$ | is a frequency of the opening wave, |
| $t_{Start}$ | is a start of driving, |
| $t_{Delay1}$ | is a delay time up to opening of the needle, and |

$t_0 = t_{Delay1} - t_{Start}$.

The fuel quantity in the blind hole is braked suddenly by the closure of the nozzle needle. A compressional wave runs through the injector into the line and into the rail (compare above).

$$p(t)_{Close} = A_{Close} \cdot e^{-d_{Close} \cdot (t - t_{End} - t_{Delay2})} \cdot \sin(\omega_{Close}(t - t_{End} - t_{Delay2}) + \phi_{Close}) \cdot \sigma(t - t_{End} - t_{Delay2})$$

where

| $A_{Close}$ | is an amplitude of a closing wave, |
|---|---|
| $d_{Close}$ | is a damping of the closing wave, |
| $\phi_{Close}$ | is a phase of the closing wave, |
| $\omega_{Close}$ | is a frequency of the closing wave, |
| $t_{End}$ | is an end of driving, and |
| $t_{Delay2}$ | is a delay time up to closing of the needle. |

If $p(t)_{Measure}$ is used to denote the pressure characteristic resulting from the opening and closing of the nozzle needle and from the constant rail pressure $p_{constant}$, it holds that:

$$p(t)_{Measure} = p_{constant} + p(t)_{Open} + p(t)_{Close}$$

$p_{constant}$ being determined with the aid of the pressure sensor 23 (FIG. 1).

If the terms specified above are substituted in this equation, the result is $$p(t)_{Measure} = p_{constant} + A_{Open} \cdot e^{-d_{Open} \cdot (t - t_{Start} - t_{Delay1})} \cdot \sin(\omega_{Open}(t - t_{Start} - t_{Delay1}) + \phi_{Open})$$

$$\cdot \sigma(t - t_{Start} - t_{Delay1}) + A_{Close} \cdot e^{-d_{Close} \cdot (t - t_{End} - t_{Delay2})}$$

$$\cdot \sin(\omega_{Close}(t - t_{End} - t_{Delay2}) + \phi_{Close}) \cdot \sigma(t - t_{End} - t_{Delay2})$$

The least-squares estimator is a linear estimator, that is to say the frequencies of the oscillations must be obtained from a time-frequency analysis.

The damping d can be corrected by a constant during the design stage, or can be estimated by a power series formulation.

$$e^{-dt} = 1 - \frac{dt}{1!} + \frac{(dt)^2}{2!} - \frac{(dt)^3}{3!} + \ldots$$

A further possibility for better determination of the amplitude, phase and damping is offered by the least-squares estimator.

The estimator is set up here by way of example for a frequency for a damped oscillation that occurs.

$$p(t) = A \cdot e^{-d \cdot (t - t_0)} \cdot \sin(\omega(t - t_0) + \phi) \cdot \sigma(t - t_0)$$

$$p(t) = A \cdot e^{-d \cdot (t - t_0)} \cdot [\cos \phi \sin(\omega(t - t_0)) + \sin \phi \cdot \cos(\omega(t - t_0))] \cdot \sigma(t - t_0)$$

$$p(t) = A \cdot \cos \phi \cdot e^{-d \cdot (t - t_0)} \cdot \sin(\omega(t - t_0)) \cdot \sigma(t - t_0) + A \cdot \sin \phi \cdot e^{-d \cdot (t - t_0)}$$

Generally, it holds for a linear least-squares estimator that:
$\overline{y} = A \cdot \overline{b} + \overline{e}$ with $\overline{b}$ as the estimate vector of the signal model.

It follows from this that:

$$\overline{y} = [x_1 \cdot x_2] \cdot \begin{bmatrix} b_1 \\ b_2 \end{bmatrix} + \overline{e}$$

Applying this to the present case, it holds that:

$$x_1 = e^{-d \cdot (t - t_0)} \cdot \cos(\omega(t - t_0)) \cdot \sigma(t - t_0)$$

$$x_2 = e^{-d \cdot (t - t_0)} \cdot \sin(\omega(t - t_0)) \cdot \sigma(t - t_0)$$

$$b_1 = A \cdot \sin \phi$$

$$b_2 = A \cdot \cos \phi$$

It now follows for the estimator that:

$$\hat{b}_{LS} = (X^T \cdot X)^{-1} \cdot X^T$$

These inverses always exist when the basis b1, b2 is linearly independent.

The symbol "$\Lambda$" above the respective parameter signifies that estimates are concerned.

This then yields:

$$\frac{\hat{b}_1}{\hat{b}_2} = \frac{A \cdot \sin \varphi}{A \cdot \cos \varphi} = \tan \varphi$$

This yields the relationship $$\varphi = \arctan\frac{\hat{b}_1}{\hat{b}_2}$$

for the phase, and $$A = \frac{\hat{b}_2}{\cos\left(\arctan\frac{\hat{b}_1}{\hat{b}_2}\right)}$$

for the amplitude.

The estimated signal, that is to say the estimated pressure characteristic is then yielded as:

$$p(t) = \frac{\hat{b}_2}{\cos\left(\arctan\frac{\hat{b}_1}{\hat{b}_2}\right)} \cdot e^{-d(t-t_0)} \cdot \sin\left(\omega(t-t_0) + \arctan\frac{\hat{b}_1}{\hat{b}_2}\right) \cdot \sigma(t-t_0)$$

This estimated pressure characteristic p(t) is illustrated graphically in FIG. 4b. The pressure characteristic actually occurring in the lead (fuel injection lead 27 in FIG. 1) to the injector is illustrated in FIG. 4a. The pre-injection is initiated at the instant t1 (=$t_{Start}$). Up to this instant, the fuel mass is assumed to be stationary (constant value of the pressure 780 bars). The absolute error is plotted in FIG. 4c as the difference between measured pressure characteristic (FIG. 4a) and estimated pressure characteristic (FIG. 4b).

Thus, the pressure can be estimated by the specified method for any desired instant after an injection process is performed (for example pre-injection). Since the instant of the start of the subsequent injection process (for example main injection) can be freely selected and is known, the pressure value present at this instant can be taken into account when calculating the injection time for this injection process. This can be done, for example, by virtue of the fact that it is not the measured pressure in the rail, but a pressure value corrected by the estimated pressure value at the start of injection which is used as input variable for a characteristic diagram KF which is stored in a memory 29 of the control unit 19 and in which injection times are stored as a function of the instantaneous value for the rail pressure and the required fuel injection quantity. The required fuel quantity can therefore be dosed with high accuracy.

We claim:

1. A method for determining an injection time in a direct-injection internal combustion engine having a high-pressure reservoir containing fuel and connected to an injector so that the fuel injects under control into a cylinder of the internal combustion engine as a function of at least a pressure in the high-pressure reservoir and a required fuel quantity, which comprises the steps of:
    splitting up a total quantity of the fuel to be fed to the cylinder of the internal combustion engine into at least two injection processes per cylinder stroke; and
    taking into account pressure fluctuations in the injector occurring between the two injection processes, and in a line between the high-pressure reservoir and the injector when determining the injection time for a next injection process.

2. The method according to claim 1, which comprises feeding in the total quantity of the fuel in a pre-injection process and a main injection process, and taking into account the pressure fluctuations initiated by the pre-injection process when determining the injection time for the main injection process.

3. The method according to claim 1, which comprises feeding in the total quantity of the fuel in a plurality of pre-injection processes and one main injection process, and taking into account the pressure fluctuations initiated by each of the pre-injection processes when determining the injection time for one of a respectively following pre-injection and the main injection process.

4. The method according to claim 3, which comprises using the pressure fluctuations occurring between individual injection processes in each case to determine a correction term with an aid of which the pressure in the high-pressure reservoir is corrected, and determining the injection time with an aid of a corrected pressure value.

5. The method according to claim 4, wherein the corrected pressure value is an input variable of a characteristic map in which injection times are stored in dependence on the required fuel quantity.

6. The method according to claim 4, which comprises determining the correction term with an aid of a least-squares estimator which, on a basis of an equation of a damped oscillation for the pressure fluctuations determines the injection pressure at a nozzle of the injector in dependence on geometrical data of an injection system and of physical boundary conditions.

7. The method according to claim 6, which comprises defining the equation of the damped oscillation for the pressure fluctuations as:

$$y(t) = A \cdot e^{-d \cdot (t-t_0)} \cdot \sin(2 \cdot \pi \cdot f(t-t_0) + \phi) \cdot \sigma(t-t_0)$$

| where | A | is an amplitude of an oscillation, |
|---|---|---|
| | d | is a damping factor, |
| | $t_0$ | is a starting instant of the oscillation, |
| | f | is a frequency, |
| | $\phi$ | is a phase, and |
| | $\sigma(t - t_0)$ | is a jump function at an instant t = 0. |

8. The method according to claim 7, which comprises using a further equation for determining an estimated pressure characteristic defined by:

$$p(t) = \frac{\hat{b}_2}{\cos\left(\arctan\frac{\hat{b}_1}{\hat{b}_2}\right)} \cdot e^{-d \cdot (t-t_0)} \cdot \sin\left(\omega(t-t_0) + \arctan\frac{\hat{b}_1}{\hat{b}_2}\right) \cdot \sigma(t-t_0),$$

where $b_1 = A \cdot \sin\varphi$
$b_2 = A \cdot \cos\varphi.$

* * * * *